March 22, 1949.  D. R. LAUX ET AL  2,465,238
PERIODIC COMPUTING DEVICE
Filed Sept. 22, 1945
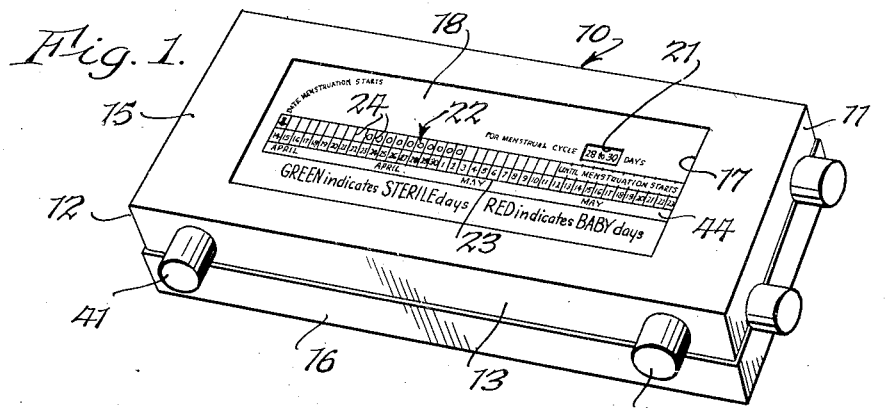
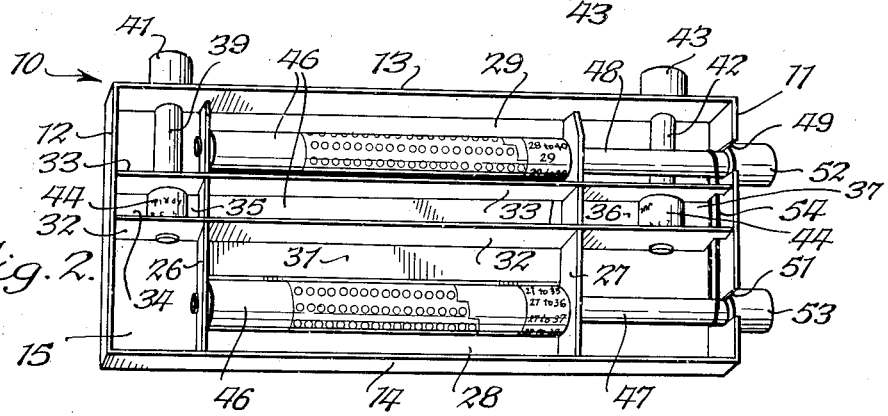
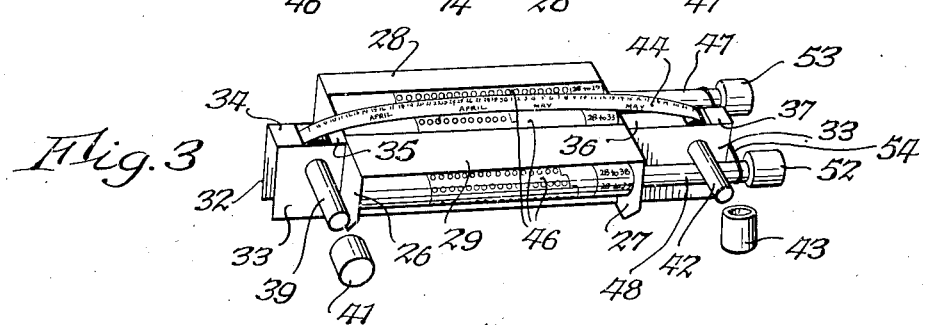
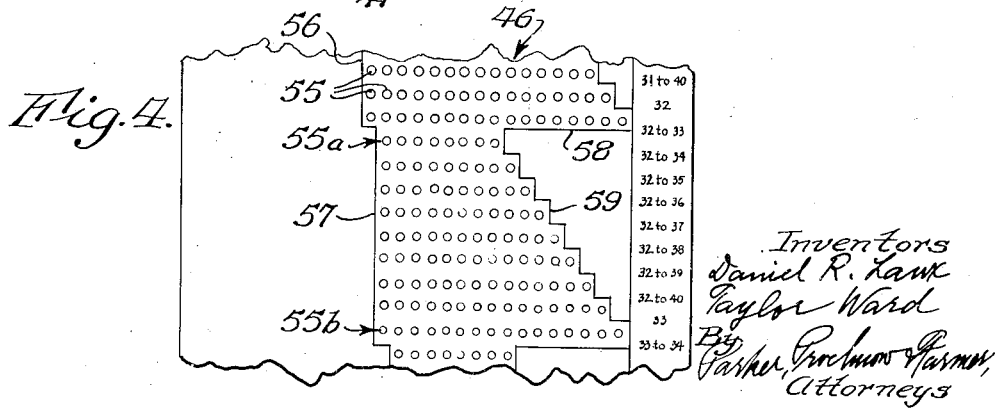
Inventors
Daniel R. Laux
Taylor Ward
By Parker, Prochnow & Parmer,
Attorneys Patented Mar. 22, 1949

2,465,238

UNITED STATES PATENT OFFICE 2,465,238

PERIODIC COMPUTING DEVICE

Daniel R. Laux, Elmira, and Taylor Ward, Ithaca, N. Y., assignors to The Rhythm Indicator, Inc., Elmira, N. Y., a corporation of New York Application September 22, 1945, Serial No. 618,050

6 Claims. (Cl. 235—86)

This invention relates to a computing device for determining the probable times of occurrence of the events in the menstrual cycle of women, and it is particularly concerned with an instrument of this nature wherein provision is made for variations or irregularities in the cycle, and from which the desired information can be ascertained without recourse to calculations.

In the cycle of reproductive activities of the female, that part termed the period of ovulation coincides with the condition of fertility. Such period is followed by an interval of sterility during which conception is improbable. K. Ogino and H. Knaus, working independently, showed that the period of ovulation occurs, under the conditions and human case histories which they studied, during the five days from the twelfth to the sixteenth day prior to a subsequent menstruation, and proposed that the time of probable fertility be increased two or three days, or to the eighteenth or nineteenth preceding day, in view of the vitality of the male sex cells. A period of approximately eight days, occurring during the cycle designated by the beginning of one flow until the beginning of another, thus represents the time of probable fertility, while the remaining portions of the cycle represent times of sterility.

Inasmuch as the overall length of the cycle may vary within wide limits, and may normally vary from twenty-three to thirty-four days or more; and inasmuch as a woman in good health may experience variations of many days in her own cycle, the actual determination of the times of probable fertility is necessarily an individual matter, and not readily subject to ascertainment except through extended observation and calculations. It has therefore been proposed to provide mechanical devices, in the nature of slide rules, charts, or the like, by means of which a physician or qualified layman could make predictions respecting the occurrence of the physiological changes, thus to simplify the calculations or to reach general approximations. Some of these devices, however, fail to take the variations or irregularities into account, while others require a residual measure of calculation which tends to confuse the user.

The present invention contemplates the provision of a device for determining the times of the events occurring according to the Ogino-Knaus biological law, as at present understood, and wherein, by a simple setting of scales showing the two known facts concerning the probable length of the cycle and the time on which menstruation starts, the precise times of probable fertility and sterility are immediately reflected. By incorporating into the instrument a chart compensating for irregularities or variations in the cycle, and a time scale which can be set to coincide with the calendar, the instrument moreover may be made to reflect actual dates for the several occurrences, as well as the relative times when they occur in the cycle itself. Such an instrument may therefore be used directly by a properly instructed layman, as well as a physician.

The principles of the invention, and a practical way in which they may be employed, will be apparent from the following description of a typical embodiment, illustrated in the accompanying drawings, wherein:

Fig. 1 is a perspective of the assembled instrument, shown as being in the form of a box having adjusting knobs along the sides, and transparent windows and indicia on the face;

Fig. 2 is a perspective viewed from the bottom, with the cover removed, showing the interior mechanism in assembled position;

Fig. 3 is a perspective of the mechanism removed from the box, and viewed from the front, as in Fig. 1, but from a different angle; and Fig. 4 is a plan or developed view of a portion of the cycle chart tape.

As viewed in Fig. 1, the instrument comprises a rectangular box, generally designated by the reference numeral 10, which includes a body portion having ends 11 and 12, sides 13 and 14, and a top 15. The bottom of the box is open, as shown in Fig. 2, but it is normally closed by a cover 16. The top 15 has a solid marginal portion which forms a frame around an opening 17, which is advantageously covered with a sheet 18 of suitable transparent plastic snugly fitted from the under side. In order to reduce the number of sheets or index cards which otherwise might be required, the sheet 18 is directly printed or coated to provide a series of indicia or scales, adapted to be aligned and to cooperate with the movable indicia hereinafter described.

Specifically, the sheet 18, as shown in Fig. 1, is painted black, or otherwise made opaque over its visible area, excepting for a small transparent area or window 21 positioned adjacent the end 11 and the side 14; and an elongated area or window 22 extending longitudinally of the opening 17. The entire window 22 is sub-divided into two sets of smaller windows or panes, by ruling longitudinally with the line 23 to form a lower and elongated pane, and vertically with the lines 24 to provide a substantial number of contiguous upper panes. The window 21 is employed to view some selected number or numbers reflecting the overall duration of the cycle, and when such setting is made, the corresponding relative periods of probable fertility and sterility will then appear on the upper portions of the vertical panes of the window 22, as will be further explained in the ensuing discussion of the cycle chart. The lower or elongated pane of the window 22, as well as the adjacent portions of the upper panes, are employed to view the actual times or dates, as given by the subsequently described calendar chart. Thus, when properly set, the visible portions of the two charts supply all the information required, as fully as such predictions can be made on the basis of present scientific knowledge.

The sheet 18 may also be provided with appropriate legends. Thus, the small window 21 is explained to be for a cycle of such number of days as appear in the opening, while the extreme left hand upper pane of the window 22 may bear an arrow, or other reference index, relating to the time when menstruation starts. While, from a physiological viewpoint, the beginning of the flow may be considered as the end of the cycle, for many persons this is an illogical concept, as by habit they count the other way. Accordingly, in the device as herein described, the beginning of menstruation is taken as the institution of the cycle as a matter of convenience. Other legends, such as that appearing on the right of the upper panes, are similarly informative, but of course are restricted to such of the upper panes as will not in any event be utilized for additional information. The legends pertaining to the actual fertile and sterile periods refer to the contrasting colors employed on the cycle chart,—red having been adopted arbitrarily to show the times of probable fertility, and green having similarly been adopted to indicate probable sterility. Obviously, details of this nature are subject to considerable modification according to the fancy of the manufacturer.

From the description as thus far developed, it will be understood that when the time of the cycle is shown through the window 21, then the days of fertility and sterility in the same cycle will be reflected in the several upper panes of the window 22. If the calendar tape is then set, so that the actual date of the month when flow began registers with the left hand upper pane, the actual dates of the successive events will be given, as each upper pane is made to correspond to one day, as given by the scale of the calendar.

Referring to Figs 2 and 3, the mechanism comprises a frame of sheet stock including transverse spaced members 26 and 27 extending parallel to the ends 11 and 12, and abutting the sides 13 and 14 to provide against shifting with respect to the indexing windows 21 and 22. These members are connected on their upper edges by two spaced panels 28 and 29, visible in Fig. 3, and a third intermediate panel 31 which is shown in Fig. 2. It will be understood that the edges of the panel 31 are spaced from the adjacent edges of the panels 28 and 29, to provide a guide and support for the cycle chart, as more fully explained hereinafter. The members 26 and 27 are formed with slots for the reception of longitudinal frame pieces 32 and 33, extending parallel to the sides of the box 10 and abutting the ends thereof to effect the proper positioning of the mechanism. As best shown in Fig. 3, the pieces 32 and 33 may be joined and reinforced by spaced transverse panels 34, 35 and 36, 37 respectively located adjacent the members 26 and 27.

The left hand projecting portions of the pieces 32 and 33 are formed with aligned apertures, serving as a bearing for a shaft 39, of such length as to extend from the frame piece 33 through the side wall 13 of the box 10. When assembled, the exposed end of the shaft is fitted with a detachable hand knob 41. In like manner, the right hand portions of the pieces 32 and 33 are formed to support a shaft 42, also extending through the wall 13 where it receives a knob 43. To each shaft, between the pieces 32 and 33, is secured the end of a calendar tape 44, which, as shown in Figs. 1 and 3 particularly, is printed with the months and days of the month, beginning as of the first of January and continuing throughout the year or longer. The day intervals on the tape are spaced to conform to the spacing of the upper panes in the window 22, so that, when any one day is aligned with a pane, the other days will register with the adjacent panes. The designations of the month may be repeated over the span of days, so that one such designation for any month will be visible, irrespective of the actual alignment of the day intervals with the reference, or left hand, upper pane.

When the parts are assembled, the tape 44 is partially supported by the transverse panels 35 and 36, and the underlying area of the panels 29 and 31. It should be stated, to avoid any misunderstanding, that in the detached view of Fig. 3, the tape appears as being bowed upwardly. However, when the mechanism is placed in the box 10, the tape is flattened, lying in a plane surface over the panels, and against the underside of the sheet 18. The ruling of the window 22 is such that, in the assembled position, so much of the tape as bears the names of the month will be visible through the lower longitudinal pane of the window, while the day numerals will be visible through and register with the lower halves of the upper panes.

It will thus be seen that any day of the year may be brought into registry with the proposed zero reference index,—namely, the arrow on the extreme left upper pane of the window 22, and accordingly the calendar scale of the instrument may be set, by turning one or the other of the knobs 41 and 43, to bring such scale into conformity with the dates of the current year. This eliminates any necessity for the calculations incident to transposing from a fixed day scale to the existing calendar, and accordingly simplifies the use of the device. Again, a numeral "1" of the calendar scale may be set under the zero reference, in order to ascertain the number of days to be assigned to each of the major events of the cycle. Inasmuch as the calendar scale may be moved in either direction, it can be rewound at the start of any year, and thus used repeatedly.

The cooperating cycle chart of the instrument comprises a relatively wide sheet 46 whose ends are secured to shafts 47 and 48, extending parallel to the sides 13 and 14 of the box 10, and journaled in bearing apertures formed in the frame members 26 and 27. These shafts project through slots 49 and 51, cut in the end wall 11, to receive turning knobs 52 and 53, respectively, so that the chart may be operated in either direction, similarly to the calendar tape 44. The shafts are advantageously interconnected, adjacent the inner surface of the wall 11, by a rubber band 54, which applies sufficient tension to retain the sheet 46 from unwinding, backlashing, and becoming improperly aligned. The sheet 46 passes through the spaces between the panels 28 and 29, and over the top of the panel 31, which thereby provides a support assuring that the visible surface will be held plane and true.

As best shown in Fig. 4, the sheet 46 is provided along its right hand margin with legends indicative of the duration of the cycle, either presented as a single number when the periodicity is quite regular, or with two numbers when experience reveals that there is a variation, or irregularity, in the number of actual days These legends are spaced vertically along the margin at intervals equal to the half height of the upper panes of the window 22, and they are so related, with respect to the window 21, that some one legend will be visible therethrough. Running horizontally from each legend, but not necessarily in precise alignment therewith, is a line of signals, here designated as circles 55, and which, for convenience, indicate the days of potential fertility. In conformity with the legends shown in Fig. 1 on the sheet 18, these signals may be colored red, or made white against a background of red extending over the entire line. It will be seen that the area mapped out by the signals 55 constitutes a pattern delimited by the irregular lines 56 and 57 on the left, and lines including those designated 58 and 59 on the right. The remaining area of the sheet may then be given a contrasting color, such as green.

The vertical spacing of the lines of signals is equal to the spacing of the legends on the right hand margin, that is, the half height of the upper panes in the window 22. The interval between signals in the same line is equal to the width of the upper panes, so that, when the parts are assembled, one line of signals 55 will be visible through the upper halves of such panes, immediately above the days exhibited by the calendar tape. Inasmuch as the window 21 is not, in this embodiment, in the same line as the upper panes, it is therefore necesary to offset the signals 55 with respect to the legends, so that, whatever legend appears through the window 21, the corresponding signals will appear through the panes of the window 22.

In use, the knobs 52 and 53 are manipulated until the appropriate legend appears in the window 21, whereupon the period of fertility for such cycle will be reflected by the signals 55 appearing through the upper panes of the window 22, and the period of sterility will also be reflected by the absence of such signals, and the visibility of the contrasting color for the cycle, such as the green color arbitrarily proposed. When the time or calendar chart is also appropriately set, then the information visible through the window 22 shows directly, and without computation, the actual days of the month, or from the start of menstruation, when both fertility and sterility are probable.

The method of laying out the chart on the sheet 46 follows the scientific facts as elucidated by Ogino and Knaus, together wtih those pertinent accepted facts relating to the physiology of the reproductive process. Under these principles, the period of ovulation plus the maximum life span of the sperm will cover eight days, and thereby establish a minimum period during which conception is possible. When the cycle is exact— that is, if the menses recur at intervals not varying by more than a day, the period of probable fertility accordingly may be taken as eight days. When the cycle is irregular, it may terminate on the earliest, or the latest day, and accordingly the period of probably fertility is increased, from the assigned minimum of eight days, by as many days as represent the probable variation. Thus, referring to Fig. 4, it will be seen that there is a line of eight signals 55a, spaced vertically or offset below the legend "32", and that the number of signals in each successive row increases by one from the preceding row, to cover cyclic irregularities of eight days shown by the legends terminating in that reading "32 to 40." Hence the row of signals 55b, which is visible when the last named legend is exposed, contains sixteen signal units symbolical of potential fertility.

Obviously, since the actual cycle of a woman experiencing irregularity or variations cannot be assuredly determined in advance, the chart should assume that the cycle will terminate on either the earliest or latest day which she may anticipate. While in such a case the actual period of ovulation may not be increased, the relation of that period to the end of the cycle can be taken into account, thus establishing days of potential or possible fertility, as compared to actual fertility.

It remains to locate the signals longitudinally with respect to the reference index, herein selected as being the extreme upper pane of the window 22. An example will show how this is done. If, in accordance with the Ogino-Knaus statement of the biological law, the period of ovulation is the time occupied by the twelfth to sixteenth day prior to the ensuing menstruation, then, for example, a cycle of thirty-two days should show the charatceristic signals 55 from the fourteenth to the twenty-first day following the start of menstruation, counting from the reference index as one. Accordingly, the left hand signal on the line 55a should register with the fourteenth division on the upper panel of panes in the window 22, and they should increase to the right with increasing variations in the periodicity, as shown in Fig. 4.

Similarly, if the minimum cyclic period is less than that illustrated in Fig. 4, as, for example, the more normal period of twenty-eight days, then the minimum of eight days will begin on the tenth day following the start of the flow, and continue through the seventeenth day. Accordingly, the left hand limts of the chart are progressively set to the left by intervals of one day on the rulings on the window 22, as the minimum days in the cycle decrease. To consider a less frequently encountered case, let it be assumed that the minimum time of the cycle is twenty days. The period of fertility then overlaps the time of flow, normally considered as being five days, and the information so given by the chart will enable the physician graphically to explain and clarify questions presented by a perplexed couple observing the proscription of the Mosaic law. Similarly, if a suppositious extreme case of cyclic variation of from twenty to thirty-one days be presented to the attending specialist, then the chart, by reason of having progressively extended the days of potential fertility in accordance with the postulates previously explained, will at once reflect the possibilities of conception.

The chart is so constructed, therefore, that the rows of signals 55 are progressively moved to the right by intervals of one day, as the minimum cyclic period increases, and are progressively extended to the right by one additional day for each day representing variations in the cycle. Such a chart, as previously explained, will, when properly aligned with the window panes, show the days on which conception is possible, because fertility is imminent. Obviously, a chart constructed on this basis has in mind the maximum of days of potential fertility, but the same principles and means may be incorporated in similar charts restricted to periods of actual fertility.

As a final example, it will be noted in Fig. 1 that the calendar tape 44 has been set to align the date of April 14 with the reference index, upon which day the subject experienced the initiation of menstrual flow. Her case history, based on observations of the prior months, reveals that her cycle varies from a minimum of twenty-eight to a maximum of thirty days, which is a typical and frequently encountered normal irregularity. As the cycle legend is set to this bracket of numbers, the underlying row of signals 55 which become visible through the upper panes appear in the tenth to nineteenth panes, counting from the left. The period between the twenty-third of April and the second of May accordingly is the time of probable fertility, and, unless biologically forestalled, the following menses should begin between the eleventh and thirteenth of the month of May.

While the invention has been described with reference to a specific and preferred embodiment thereof, it will be readily apparent that such embodiment is susceptible of numerous modifications and variations, and that many of the principles and advantages may be utilized in other forms of instruments. It is therefore intended that the invention should not be restricted to the specific details as illustrated and described, but that it should be considered to have a scope sufficient to encompass all such devices as are within the purview of the following claims.

We claim:

1. A computing device of the character described, comprising a plurality of index panes spaced to represent consecutive days, said panes being of such number as to embrace in their entirety the normal spans of reproductive cycles, a time record movable into registry with respect to said panes, said time record bearing indicia displaying the days encompassed by a cycle, and a cycle sheet bearing a chart setting forth the periods of relative probable fertility and sterility for various cycles and movable into registry with said panes, the disposition of the indicia on the chart being so related with respect to the biological facts known with respect to such cycles that upon alignment of said indicia for any given cycle with said panes, the indicia of the time record displays the probable times of occurrence of the events of such cycle.

2. A computing device of the character described, comprising a plurality of index panes spaced to represent consecutive days, the number of such panes being such as to embrace in their entirety the normal spans of reproductive cycles, a cycle sheet bearing signals designating the fertile and relatively sterile days occurring in any given cycle, and means for moving the signals for any given cycle into registry with the panes, thereby to exhibit the information displayed by such signals to the exclusion of signals relating to other cycles, and means associated with the panes to provide a zero index and reference point with respect to the signals so exhibited.

3. A computing device of the character described comprising a box formed with an opening in its top and with side walls, a removable frame in said box formed with members extending between opposite side walls to position said frame in the box with respect to the opening, a pair of spaced rollers mounted on said frame in parallel relation to opposite side walls, portions of said rollers extending through a side wall for manual operation thereof, a cycle chart mounted on and extending between said rollers and movable over said opening, said chart being provided with rows of regularly spaced signals, each row of which is so located with respect to its length and position on the chart as to display the relatively fertile and sterile days in some one reproductive cycle, a second pair of rollers mounted on said frame in parallel relation to opposite side walls of the box, a time tape extending between said second pair of rollers, said tape being formed with regularly spaced indicia indicative of consecutive days, an index sheet disposed over the opening in the top of the box, and regularly spaced panes in the index sheet aligned with the signals in some one row of the chart and with a portion of the indicia on the tape.

4. In a computing device of the character described, an elongated box formed with an opening in its top, an index sheet disposed over said opening and formed with a row of regularly spaced panes, a time tape mounted in the box beneath said panes and movable with respect thereto, said tape being provided with regularly spaced markings indicative of consecutive days adapted to be aligned with said panes to establish a calendar reading therethrough, a pair of spaced rotatable shafts mounted in the box parallel to said row of panes, a cycle chart extending between the shafts and progressively visible through said panes upon rotation of said shafts, said chart being formed with rows of signals, the spacing between consecutive rows being such that only one row is visible when brought into registry with said panes, the spacing between the signals in each row being the same as the spacing of the panes whereby all the signals in any row will be simultaneously aligned with corresponding panes and markings on the time tape, the signals in consecutive rows being progressively offset and varied in total number to correspond to variations in the minimum period of a cycle and variations displaying minimum and maximum cyclic periods.

5. In a computing device of the character described, a box having a top formed with an opening and with side walls, a frame mounted in the box and including spaced members extending between opposite side walls to secure the frame with respect to said opening, a pair of roller shafts mounted parallel to one pair of opposite side walls and extending exteriorly of the box, operating knobs on the extending portions of the shafts, a chart extending between said shafts and beneath said opening, a supporting member in said frame to support a portion of the chart adjacent to and in parallelism with said opening, a plurality of rows of signals on said chart, said signals being varied with respect to their number in each row and the positioning of the row on the chart, an index sheet covering said opening, said sheet being formed with a row of index panes through which the signals of any chart row may be exhibited, a second pair of shafts mounted on the frame in parallelism to opposite side walls, a time tape extending between said second pair of shafts and beneath said index panes, means for moving the time tape, and means connected to at least one pair of said shafts for securing the same against unintended rotary movement.

6. A device for ascertaining the events in the menstrual cycle comprising a supporting frame, an elongated viewing opening positioned over a predetermined portion of the frame, said opening being divided into a row of more than thirty regularly spaced individual panes of uniform height and width, a fixed index marking designating one of said panes as a reference point, a pair of spaced rolls mounted beneath said panes and parallel to the elongated dimension of said opening, a menstrual cycle chart positioned between said rolls, operating knobs for rotating the rolls thereby to move said chart beneath said panes, said chart comprising rows of signals corresponding to at least one of the events in the menstrual cycle, said signals being progressively offset in one direction with respect to said reference point in uniform increments corresponding to the width of a pane in proportion to the minimum number of whole days in the cycle and being progressively offset in the opposite direction with respect to said reference point in uniform increments corresponding to the width of one pane and in proportion to the number of days probable variation in said cycle, said parallel rolls maintaining each row of the chart in predetermined relation to said reference point as said chart is moved beneath said panes, a reference window located in a predetermined position above the frame with respect to said elongated opening, a series of numerals on said chart displaying menstrual cycles in terms of minimum whole days and variations therein, said numerals being so related to the rows of signals that the signals corresponding to any numeral appear beneath the panes simultaneously with the appearance of the numeral beneath the window, a second pair of rolls mounted beneath said opening and transversely of the elongated dimension thereof, a day tape mounted between said second pair of rolls, rotating knobs to move the day tape in either direction, said tape being so positioned with respect to the opening as to overlap and obscure a portion only of said panes and all but one of the rows of signals on the chart, said tape being provided with day numerals uniformly spaced in increments corresponding to the width of the panes, whereby the day tape may be preset with respect to said reference point to ascertain the calendar sequence of events of the cycle visible through said panes.

DANIEL R. LAUX.
TAYLOR WARD.

REFERENCES CITED

The following references are of record in the file of this patent:

UNITED STATES PATENTS

| Number | Name | Date |
|---|---|---|
| 909,290 | Hall | Jan. 12, 1909 |
| 1,788,511 | Fenimore | Jan. 13, 1931 |